United States Patent Office 3,694,211
Patented Sept. 26, 1972

3,694,211
ORGANIC MATERIALS CONTAINING
UV-ABSORBERS
Shui Sato, Tomio Nakajima, Masashi Nakano, Ken-ichi Kishi, Tokyo, and Sadao Sugita, Hanno, Japan, assignors to Konishiroku Photo Industry Co., Ltd.
No Drawing. Filed Apr. 13, 1971, Ser. No. 133,703
Claims priority, application Japan, Apr. 17, 1970, 45/32,370
Int. Cl. F21v 9/06; C07d 71/00
U.S. Cl. 96—84                                    3 Claims

ABSTRACT OF THE DISCLOSURE

The compounds used in the present invention are represented by the general formula,

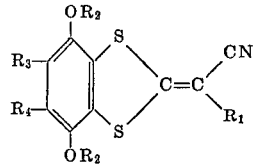

wherein $R_1$ is a nitrile, alkoxycarbonyl or carbamoyl group; $R_2$ is a hydrogen atom or a substituted or unsubstituted and saturated or unsaturated aliphatic group; and $R_3$ and $R_4$ are individually a hydrogen atom or an alkyl or alkoxyl group.

A compound of the general formula is used as an ultraviolet light absorber in organic materials such as shaped synthetic resin materials, synthetic and natural fiber materials, oils, paints, printing inks and photographic materials.

---

This invention relates to novel and useful organic materials having marked resistance against deterioration or degradation in quality due to irradiation with ultraviolet rays. More particularly, the invention pertains to organic materials characterized by containing acrylonitrile derivatives having 1,3-benzodithiol nuclei which are represented by the general formula set forth later.

As is well known, ultraviolet rays are contained in the solar rays (ordinarily, ultraviolet rays having a wave length of less than 2930 A. are absorbed in ozone in the air and do not reach the earth), and display strong photoelectric and photochemical effects. When exposed to such ultraviolet rays, most of organic materials undergo undesirable influence. For example, vinyl chloride films or sheets are deprived of their plasticity, dyed textiles are faded or color photographs are contaminated.

In order to prevent organic materials from degradation in quality due to such ultraviolet rays, many compounds have been proposed. However, some of them (e.g. dihydroxybenzophenone type compounds) have been colored by themselves or are excessively short in absorption wave length, and the others (e.g. 2-phenylbenzotriazole type compounds) are low in synthesis yields or difficultly soluble in solvents. For the above reasons, the compounds proposed hitherto are not preferable for practical use.

The compounds used in the present invention have such characteristics that they have high ultraviolet-absorbing abilities, scarcely absorb visible rays, are quite fast to light and not decomposed even when exposed to light, and are extremely high in solubility for various solvents. Moreover, most of the compounds used in the present invention are colorless, and those which have been colored have only an extremely slight yellow color. Even when incorporated into organic materials, therefore, the compounds do not injure the qualities of the organic materials. Accordingly, the organic materials in accordance with the present invention which contain such compounds as mentioned above are not only markedly high in resistance to ultraviolet rays but also are not deteriorated in quality.

Typical examples of organic materials, which can be prevented from the undesirable effects of ultraviolet rays by incorporation of the compounds used in the present invention, include shaped synthetic resin materials (synthetic resin films, molded articles, etc.), synthetic and natural fiber materials, oils, paints, printing inks and photographic materials.

The compounds used in the present invention are represented by the general formula,

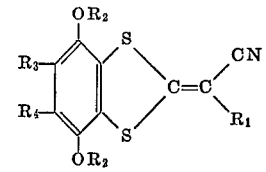

wherein $R_1$ is a nitrile, alkoxycarbonyl or carbamoyl group; $R_2$ is a hydrogen atom or a substituted or unsubstituted and saturated or unsaturated aliphatic group; and $R_3$ and $R_4$ are individually a hydrogen atom or an alkyl or alkoxyl group.

The compounds of the above-mentioned general formula are colorless or slightly yellowish white crystals and are extremely strong in ultraviolet-absorbing action, so that organic materials incorporated with the said compounds are markedly stable to ultraviolet rays and excellent in light fastness. The above-mentioned compounds may be used in admixture with other commercially available ultraviolet-absorbers to further increase the light fastness of the organic materials. Further, they have actions as solubilizing agents.

Typical examples of the compounds having the aforesaid general formula are as set forth in the table below, but compounds usable in the present invention are not limited only to the exemplified compounds.

Examples of the compounds:

| Exemplified compound Number | $R_1$ | $R_2$ | $R_3$ | $R_4$ |
|---|---|---|---|---|
| I | —CN | n-$C_5H_{11}$ | —$CH_3$ | H |
| II | —CN | H | —$CH_3$ | H |
| III | —CN | H | H | H |
| IV | —$CONH_2$ | n-$C_8H_{17}$ | $C_8H_{17}$ | H |
| V | —$CONH_2$ | H | H | H |
| VI | —$COOC_2H_5$ | n-$C_5H_{11}$ | —$OCH_3$ | —$CH_3$ |
| VII | —CN | n-$C_6H_{13}$ | t-$C_4H_9$ | H |
| VIII | —CN | n-$C_{12}H_{25}$ | H | H |
| IX | —$COOC_2H_5$ | n-$C_{16}H_{33}$ | —$CH_3$ | H |
| X | —CN | n-$C_{18}H_{37}$ | —$CH_3$ | —$CH_3$ |
| XI | —CN | —$CH_2CH_2OC_2H_5$ | H | H |
| XII | —$COOCH_3$ | —$CH_2CH_2OC_2H_5$ | —$CH_3$ | H |
| XIII | —$CONH_2$ | —$CH_2CH_2OC_2H_5$ | —$CH_3$ | H |
| XIV | —CN | —$CH_2CH=CH_2$ | H | H |
| XV | —$COOCH_3$ | —$CH_2CH=CH_2$ | t-$C_4H_9$ | H |
| XVI | —$CONH_2$ | —$CH_2CH=CH_2$ | —$CH_3$ | —$CH_3$ |
| XVII | —CN | sec-$C_4H_9$ | —$CH_3$ | H |
| XVIII | —$COOCH_3$ | H | H | H |
| XIX | —CN | —$CH_2COOC_2H_5$ | H | H |
| XX | —$COCH_3$ | —$CH_2COOC_2H_5$ | —$CH_3$ | H |
| XXI | —CN | —$CH_2$—⟨⟩ | H | H |
| XXII | —$CONH_2$ | Same as above | t-$C_4H_9$ | H |
| XXIII | —CN | —$CH_2CH_2OC_2H_5$ | H | H |
| XXIV | —$COCH_3$ | —$CH_2CH_2OC_2H_5$ | —$CH_3$ | H |

Concrete procedures for synthesis of typical compounds among those exemplified in the above table are illustrated below with reference to synthesis examples. Procedures for synthesis of the starting materials used in the synthesis examples are disclosed in detail in Liebig's Annalen Der Chemie, 726, 103–109 (1969).

SYNTHESIS EXAMPLE 1

[Synthesis of the exemplified compound III, 4,7-dihydroxy-2-dicyanomethylene-1,3-benzodithiol (hereinafter referred to as the "compound B")]

Into a mixed liquid comprising 80 g. (2 moles) of caustic soda and 900 ml. of ethyl alcohol were dropped with stirring at 10° to 15° C. 66 g. (1 mole) of malonitrile and then 76 g. (1 mole) of carbon disulfide. The resulting mixture was stirred at room temperature for 1 hour to deposit a precipitate, which was then washed with ethyl alcohol to obtain 170 g. of disodium mercapto-methylene-malondinitrile (hereinafter referred to as the "compound A").

37.2 grams (0.2 mole) of the thus obtained compound A was dissolved in a solution comprising 80 ml. of dimethylformamide, 100 ml. of water and 23.3 ml. of glacial acetic acid. Into the resulting solution was dropped at 0° C. a solution of 43 g. (0.4 mole) of p-benzoquinone in 25.0 ml. of dimethylformamide, and the mixed solution was allowed to stand at 0° C. for 12 hours and then poured into 3 liters of ice water to deposit crystals. The crystals were recovered by filtration and then recrystallized from dimethylformamide to obtain 43.2 g. of the compound B, M.P. above 300° C., absorption maximum 373 m$\mu$.

*Elementary analysis.*—Found (percent): C, 48.16; H, 1.68; N, 11.29. Cal'd. (percent): C, 48.43; H, 1.63; N, 11.30.

SYNTHESIS EXAMPLE 2

[Synthesis of the exemplified compound II, 4,7-dihydroxy-5-methyl-2-dicyanomethylene-1,3-benzodithiol (hereinafter referred to as the "compound C")]

Into a solution of 14.9 g. (0.08 mole) of the compound A in a solvent comprising 30 g. of dimethylformamide, 60 ml. of water and 9.8 g. of glacial acetic acid was dropped with stirring at −5° to 0° C. a solution of 20.0 g. (0.16 mole) of p-toluquinone in 160 g. of dimethylformamide. The mixed solution was allowed to stand with ice-cooling for 12 hours and then poured into 1 liter of ice water to deposit crystals. The crystals were recovered by filtration, washed with water and then recrystallized from an acetone-petroleum benzine mixture to obtain 17.0 g. of the compound C, M.P. above 265° C., absorption maximum 375 m$\mu$.

*Elementary analysis.*—Found (percent): C, 49.62; H, 2.53; N, 10.70. Cal'd. (percent): C, 49.61; H, 2.31; N, 10.52.

SYNTHESIS EXAMPLE 3

[Synthesis of the exemplified compound XVIII, 4,7-dihydroxy - 2 - (methoxycarbonyl-cyanomethylene)-1,3-benzodithiol]

Into a solution of 15 g. (0.07 mole) of disodium mercapto-methylene-cyanoacetic acid methyl ester in a solvent comprising 100 ml. of dimethylformamide, 5 ml. of water and 7.7 ml. of glacial acetic acid was dropped with stirring at 0° C. a solution of 13.8 g. (0.14 mole) of p-benzoquinone in 30 ml. of dimethylformamide. The mixed solution was stirred at 0° C. for 4 hours and then poured into 2 liters of ice water to deposit crystals. The crystals were recovered by filtration, washed with water, dried and then column-chromatographically separated by use of aluminum oxide and a 80:10:10 mixture of acetone, benzene and glacial acetic acid to obtain 4.9 g. of the exemplified compound XVIII, M.P. above 300° C., absorption maximum 373 m$\mu$.

*Elementary analysis.*—Found (percent): C, 47.03; H, 2.80; N, 5.00. Cal'd. (percent): C, 46.96; H, 2.51; N, 4.99.

SYNTHESIS EXAMPLE 4

[Synthesis of the exemplified compound V, 4,7-dihydroxy-2-(carbamoyl-cyanomethylene)-1,3-benzodithiol]

Into a solution of 15 g. (0.07 mole) of dipotassium mercapto-methylene-cyanoacetamide in a solvent comprising 55 g. of dimethylformamide, 10 ml. of water and 7.62 g. of glacial acetic acid was dropped with stirring at 0° C. a solution of 13.8 g. (0.14 mole) of p-benzoquinone in 65 g. of dimethylformamide. The mixed solution was allowed to stand at 0° C. for 10 hours and then poured into 1 liter of ice water to deposit crystals. The crystals were recovered by filtration and recrystallized from acetone to obtain 9.0 g. of the exemplified compound V, M.P. above 300° C., absorption maximum 373 m$\mu$.

*Elementary analysis.*—Found (percent): C, 44.80; H, 1.49; N, 10.18. Cal'd. (percent): C, 45.10; H, 1.52; N, 10.52.

SYNTHESIS EXAMPLE 5

[Synthesis of the exemplified compound XIV, 4,7-di-(vinylmethoxy)-2-dicyanomethylene-1,3-benzodithiol]

A mixture comprising 1.24 g. (0.05 mole) of the compound B, 1.82 g. (0.015 moles) of allyl bromide and 2.1 g. (0.015 mole) of potassium carbonate was refluxed for 2 hours in 20 ml. of anhydrous acetone. After allowing to cool, the mixture was poured into a dilute aqueous alkali solution to deposit crystals. The crystals were recovered by filtration, washed with a dilute aqueous alkali solution and then with water, and recrystallized from tetrahydrofuran to obtain 1.1 g. of the exemplified compound XIV, M.P. 225–226° C., absorption maximum 370 m$\mu$.

*Elementary analysis.*—Found (percent): C, 58.63; H, 4.00; N, 8.50. Cal'd. (percent): C, 58.51; H, 3.68; N, 8.53.

SYNTHESIS EXAMPLE 6

[Synthesis of the exemplified compound XIX, 4,7-di(carboethoxymethoxy)-2-dicyanomethylene-1,3 - benzodithiol]

A mixture comprising 1.24 g. (0.005 mole) of the compound B, 2.5 g. (0.015 mole) of ethyl bromoacetate and 2.1 g. (0.015 mole) of potassium carbonate was refluxed for 1.5 hours in 20 ml. of anhydrous acetone. After allowing to cool, the mixture was poured into water to deposit crystals. The crystals were recovered by filtration, washed with acetone and then recrystallized from an ethanol-acetonitrile mixture to obtain 1.6 g. of the exemplified compound XIX, M.P. 197°–199° C., absorption maximum 369 m$\mu$.

*Elementary analysis.*—Found (percent): C, 51.30; H, 4.03; N, 6.96. Cal'd. (percent): C, 51.41; H, 3.83; N, 6.66.

SYNTHESIS EXAMPLE 7

[Synthesis of the exemplified compound XXI, 4,7-di (phenylmethoxy) - 2 - dicyanomethylene - 1,3 - benzodithiol]

A mixture comprising 2.5 g. (0.01 mole) of the compound B, 5.2 g. (0.03 mole) of benzyl bromide and 4.2 g. (0.03 mole) of potassium carbonate was refluxed for 3 hours in 40 ml. of anhydrous acetone. Thereafter, the mixture was poured into a dilute aqueous caustic soda solution to deposit crystals. The crystals were recovered by filtration, washed with water and then recrystallized from benzene to obtain 2.1 g. of the exemplified compound XXI, M.P. 229°–230° C., absorption maximum 370 m$\mu$.

*Elementary analysis.*—Found (percent): C, 67.47; H, 3.50; N, 6.59. Cal'd. (percent): C, 67.27; H, 3.67; N, 6.53.

SYNTHESIS EXAMPLE 8

[Synthesis of the exemplified compound XXIII, 4,7-di($\beta$ - ethoxyethoxy) - 2 - dicyanomethylene-1,3-benzodithiole]

A mixture comprising 2.5 g. (0.01 mole) of the compound B, 4.6 (0.03 mole) of $\beta$-ethoxyethylene bromide and 4.2 g. (0.03 mole) of potassium carbonate was boiled for 9 hours in 40 ml. of anhydrous acetone. After allowing to cool, the mixture was poured into a dilute aqueous caustic soda solution to deposit crystals. The crystals were recovered by filtration, successively washed with a dilute aqueous caustic soda solution and water in this order, dried and then recrystallized from an aqueous ethanol solution to obtain 0.4 g. of the exemplified compound XXIII, M.P. 129°–133° C., absorption maximum 371 m$\mu$.

*Elementary analysis.*—Found (percent): C, 55.55; H, 5.20; N, 7.23. Cal'd. (percent): C, 55.08; H, 5.13; N, 7.13.

SYNTHESIS EXAMPLE 9

[Synthesis of the exemplified compound VIII, 4,7-didodecyloxy-2-dicyanomethylene-1,3-benzodithiole]

A mixture comprising 1.24 g. (0.005 mole) of the compound B, 4.0 g. (0.015 mole) of dodecyl bromide and 2.1 g. (0.015 mole) of potassium carbonate was boiled for 12 hours in 20 ml. of anhydrous acetone. After allowing to cool, the mixture was poured into a dilute aqueous caustic soda solution to deposit crystals. The crystals were recovered by filtration, washed with water and then recrystallized from a methanol-tetrahydrofuran mixture to obtain 2.0 g. of the exemplified compound VIII, M.P. 140°–142° C., absorption maximum 371 m$\mu$.

*Elementary analysis.*—Found (percent): C, 69.98; H, 9.06; N, 4.76. Cal'd. (percent): C, 69.81; H, 8.96; N, 4.79.

The compound used in the present invention is incorporated in an amount within the range of 1 to 10% into an organic material, photographic material or textile material which is desired to be protected from ultraviolet rays. The manner of incorporation of the compound varies depending on the kind of the material to be protected. For example, in case the compound is desired to be incorporated into a water-soluble paint or the like, it may be used in the form of a solution in such a hydrophilic solvent as alcohol, while in case the compound is desired to be incorporated into a so-called plastic product such as polyvinyl chloride or polyethylene, it may be incorporated at an optional stage during the production thereof, either in the form of a solution in the plasticizer used or in the form of a solution in a hydrophobic solvent. In the case of such a material as photographic material, oil or the like, the compound may be incorporated therein according to a suitable procedure using any of hydrophilic or hydrophobic solvent. In case the compound is desired to be used in combination with other ultraviolet-absorber, the amount thereof may be equal to that of the said ultraviolet-absorber. Examples of such ultraviolet-absorber include compounds of the benzophenone, acrylonitrile, thiazoline, benzotriazole, stilbene, oxazole, thiazole and imidazole types, but these are, of course, not limitative.

The present invention is illustrated in further detail below with reference to examples.

EXAMPLE 1

In this example was used a material composed of 70 parts of a polyvinyl chloride powder and 27 parts of dioctyl phthalate as a plasticizer. Into the said plasticizer was incorporated as an ultraviolet-absorber 3 parts of each of the exemplified compounds (I), (IV), (VI), (XII), (XV), (XIX) and (XXII). The resulting mixtures were individually extruded through a hot roll kept at 180° to 200° C. to prepare polyvinyl chloride sheets of 10$\mu$ in thickness.

For comparison, a sheet was prepared in the same manner as above, except that no ultraviolet-absorber was used.

The thus prepared sheets were individually covered on the "blue scale" designated by the "Testing Method for Colour Fastness" (cf. JIS LO841–1966, and then subjected to light fastness tests for a long period of time by irradiation with direct sunlight and carbon arc lamp. Thereafter, discloration of the sheets was judged in comparison with that of the blue scale.

TABLE 1

| Exemplified compound | Sunlight irradiation (50 hr. 150 hr.) | | Carbon arc lamp irradiation (80 hr. 160 hr.) | | Color of sheet after irradiation | |
|---|---|---|---|---|---|---|
| | Discoloration at the time of fading of grade 3 blue scale | Discoloration at the time of fading of grade 5 blue scale | Discoloration at the time of fading of grade 3 blue scale | Discoloration at the time of fading of grade 5 blue scale | Sunlight | Carbon arc lamp |
| None | Grade 3 | Grade 5 | Grade 3 | Grade 5 | Pale fading spots appear. | Pale fading spots appear. |
| I | Grade 5 | Grade 8 | Grade 6 | Grade 8 | No change observed | No change observed. |
| IV | do | Grade 7 | do | do | do | Do. |
| VI | do | do | Grade 5 | Grade 7 | do | Do. |
| XII | Grade 6 | Grade 8 | Grade 6 | Grade 8 | do | Do. |
| XV | Grade 5 | Grade 7 | Grade 5 | do | do | Do. |
| XIX | do | do | Grade 6 | do | do | Do. |
| XXII | do | do | do | do | do | Do. |

NOTE.—Evaluation of grades in light fastness tests: Grade 1=Lowest; Grade 2=Low; Grade 3=Moderate; Grade 4=Somewhat favorable; Grade 5=Favorable; Grade 6=Quite favorable; Grade 7=Excellent; Grade 8=Markedly excellent.

The results obtained were as set forth in Table 1. From Table 1, it is understood that as compared with the sheet incorporated with none of the exemplified compounds, the sheets incorporated with the exemplified compounds were scarcely colored in the light fastness tests carried out by irradiation with sunlight and carbon arc lamp for a long period of time, and could prevent the fading of the blue scale dyeings.

EXAMPLE 2

A mixture comprising 100 parts of a white cellulose triacetate powder, 12 parts of triphenyl phosphate as a plasticizer, 8 parts of phthalethyl glycolate and 0.3 part of Sumiplast Blue 3R (trade name for a product of Sumitomo Chemical Co.) as a blue-coloring dye was dissolved in a 7:3 methylene chloride-alcohol mixture, and the resulting solution was divided into 6 portions. The thus prepared 6 solutions were individually incorporated with 5 parts of each of the exemplified compounds (II), (VII), (IX), (XIII), (XV), (XX) and (XXIV). These solutions (dopes) were individually coated on a copper plate and then dried at 70° C. for 40 minutes to prepare triacetate sheets of 1 mm. in thickness.

For comparison, a sheet was prepared in the same manner as above, except that no ultraviolet-absorber was used.

Each of the thus prepared samples was measured in blue color density (red filter density) by means of a photoelectric colorimeter. Thereafter, the sample was exposed for 100 and 200 hours to a carbon arc lamp by use of a Fade-O-meter, and again measured in density. From the difference between the two densities, the percentage of density decrease after exposure was calculated. Further, each triacetate sheet was tested in brittleness after exposure. The results obtained were as set forth in Table 2.

TABLE 2

| Exemplified compound | Fade-O-meter exposure | | Brittlemess bending test of sample after exposure to Fade-O-Meter for 200 hrs. | Effect |
|---|---|---|---|---|
| | Blue color density decrease (percent after exposure to carbon arc lamp for 100 hrs. | Blue color density decrease (percent after exposure to carbon arc lamp for 200 hrs. | | |
| None | 57 | 85 | Split into 2 | Inferior. |
| II | 11 | 22 | Slight bend mark | Favorable. |
| VII | 15 | 25 | Scarcely varied | Do. |
| IX | 10 | 18 | Slight bend mark | Do. |
| XIII | 11 | 23 | Scarcely varied | Do. |
| XV | 10 | 20 | ....do | Do. |
| XX | 12 | 26 | Slight bend mark | Do. |
| XXIV | 11 | 25 | ....do | Do. |

The bending test result shows the variation in the case where the sample was folded in two so that the bend angle became 0°.

From Table 2, it is understood that blue triacetate sheets according to the present invention could be greatly prevented from fading even when exposed to Fade-O-meter for a long period of time, and that the extent of brittleness thereof scarcely varied from that observed before exposure.

EXAMPLE 3

A red-sensitive silver chlorobromide gelatinous photographic emulsion containing a cyan coupler was coated on a photographic baryta paper. Thereafter, a gelatin protective layer incorporated with each of the exemplified compounds (I), (IV), (VII), (XII) and (XXII) was coated on said emulsion layer, so that the amount of gelatin protective layer became 6.0 mg. per 10 cm.$^2$, and then dried to prepare samples.

The above-mentioned gelatin protective layer containing the exemplified compound was prepared in the following manner: A mixture comprising 3 g. of the exemplified compound, 3 ml. of tri-O-cresyl phosphate and 6 ml. of ethyl acetate was added to 60 ml. of a 10% aqueous gelatin solution containing saponin. The resulting mixture was dispersed by means of a colloid mill and then mixed with 40 ml. of water.

For comparison, a sample was prepared in the same manner as above, except that no exemplified compound was used.

Each of the thus prepared samples was exposed, subjected to color development, hardening, bleaching and water-washing treatments, and then dried. The thus treated samples were measured in the red color density of cyan image and the residual color density (measured in terms of blue color density) of non-image portion, and then exposed to direct sunlight for 55 hours. Thereafter, the sample was again measured in said densities to calculate the decrease of red color density and residual color density. The results obtained were as set forth in Table 3.

TABLE 3

| Exemplified compound | Red color density, decrease ratio, density after exposure to sunlight/ density before exposure to sunlight (percent) | Contamination density | | Effect |
|---|---|---|---|---|
| | | Before exposure to sunlight | After exposure to sunlight | |
| None | 63 | 0.03 | 0.14 | No fading prevention. |
| I | 11 | 0.03 | 0.06 | Favorable fading prevention. |
| IV | 10 | 0.03 | 0.07 | Do. |
| VII | 10 | 0.03 | 0.06 | Do. |
| XII | 12 | 0.03 | 0.06 | Do. |
| XXII | 11 | 0.03 | 0.06 | Do. |

From Table 3, it is understood that the cyan dye images of the light-sensitive silver halide color photographic materials according to the present invention were greatly inhibited from fading and contamination increase due to ultraviolet rays.

EXAMPLE 4

Five nylon cloth sheets of 100 cm.$^2$ in size were prepared. Among these, four sheets were individually dipped at 20° C. for 20 seconds in a 2% methanol solution of each of the exemplified compounds (III), (V), (XVIII) and (XIX), and then dried at 50° C. for 30 minutes. In the same manner as above, the remaining one sheet was dipped in the methanol solution and then dried. Each of the nylon sheets was measured in blue color density by means of a photoelectric colorimeter and then subjected in the same manner as in Example 1 to sunlight irradiation and Fade-O-meter test using a carbon arc lamp. Thereafter, the exposed sample was again measured in density to calculate the residual color density thereof. The results obtained were as set forth in Table 4. As is clear from Table 4, the white nylon sheets were improved in light fastness by incorporation of the exemplified compounds, and the white ground of each sheet was inhibited from contamination without any substantial change.

TABLE 4

| Exemplified compound | Before test | Sunlight irradiation | | Carbon arc lamp irradiation | | Effect |
|---|---|---|---|---|---|---|
| | | 150 hrs. | 300 hrs. | 160 hrs. | 320 hrs. | |
| None | 0.13 | 0.21 | 0.38 | 0.32 | 0.45 | Contamination occurred. |
| III | 0.12 | 0.14 | 0.16 | 0.16 | 0.21 | Contamination prevented. |
| V | 0.13 | 0.15 | 0.18 | 0.15 | 0.20 | Do. |
| XVIII | 0.13 | 0.14 | 0.18 | 0.15 | 0.22 | Do. |
| XIX | 0.13 | 0.14 | 0.20 | 0.15 | 0.24 | Do. |

What is claimed is:

1. An organic material characterized by containing as an ultraviolet-absorber a compound of the general formula,

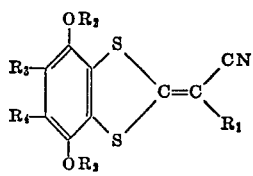

wherein $R_1$ is a nitrile, alkoxycarbonyl or carbamoyl groups; $R_2$ is a hydrogen atom or a substituted or unsubstituted and saturated or unsaturated aliphatic group; and $R_3$ and $R_4$ are individually a hydrogen atom or an alkyl or alkoxyl group.

2. An organic material as claimed in claim 1, wherein said ultraviolet-absorber is used for a shaped resin material, a photographic material or a textile material.

3. An ultraviolet-absorber which is a compound of the general formula,

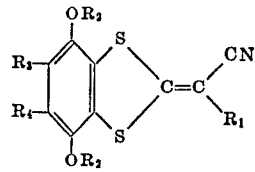

wherein $R_1$ is a nitrile, alkoxycarbonyl or carbamoyl group; $R_2$ is a hydrogen atom or a substituted or unsubstituted and saturated or unsaturated aliphatic group; and $R_3$ and $R_4$ are individually a hydrogen atom or an alkyl or alkoxyl group.

References Cited
UNITED STATES PATENTS

| | | | |
|---|---|---|---|
| 2,547,723 | 4/1951 | Sundholm | 260—327 M |
| 3,197,472 | 7/1965 | Vest | 260—327 M |

GEORGE F. LESMES, Primary Examiner

J. P. BRAMMER, Assistant Examiner

U.S. Cl. X.R.

117—138.5; 252—300; 260—45.8 R, 327 M